(No Model.)
C. W. BALDWIN.
Elevator.
No. 240,803.              Patented May 3, 1881.
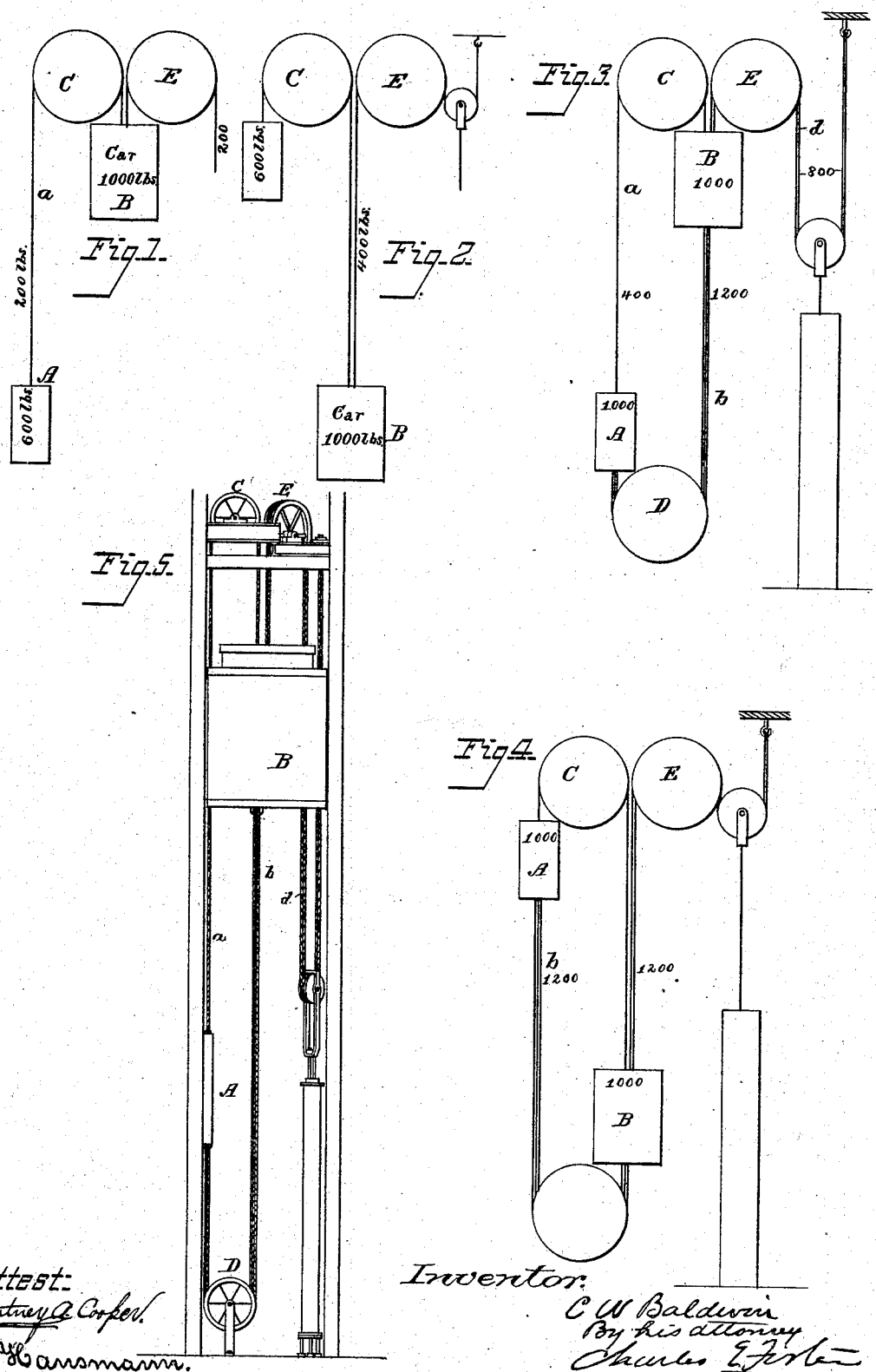
Attest:
Courtney A. Cooper
A. Hausmann
Inventor:
C W Baldwin
By his attorney
Charles E Foster

UNITED STATES PATENT OFFICE.

CYRUS W. BALDWIN, OF CHICAGO, ILLINOIS.

ELEVATOR.

SPECIFICATION forming part of Letters Patent No. 240,803, dated May 3, 1881.

Application filed March 19, 1881. (No model.)

*To all whom it may concern:*

Be it known that I, CYRUS W. BALDWIN, of Chicago, in the county of Cook and State of Illinois, have invented an Improvement in Elevators, of which the following is a specification.

My invention relates to that class of elevators in which the car or platform is suspended by a rope or other flexible suspensory passing around or over a sheave; and the object of my invention is to maintain the weight of the car and suspensories in equilibrium, whatever may be the position of the car in the well.

In the drawings, Figures 1 and 2 are diagrams illustrating the ordinary mode of suspending and counterbalancing elevator cars and platforms; Figs. 3 and 4, diagrams illustrating my invention; and Fig. 5 is a view representing a car, suspensories, counter-balance, and elevating appliances, illustrating my improvement in connection with a Baldwin elevator.

The ordinary method of counterbalancing the cars or platform of passenger and goods elevators, is to connect a counterbalance-weight, A, about equal to the weight of the car, to the end of a rope or cable, $a$, which passes around the sleeve C to the car B. In such case the weight upon the opposite sides of the sleeve C varies according to the position of the parts, for even if the counter-balance is equal in weight to that of the car the transfer of the cables from side to side constantly disturbs the equilibrium. Thus, when the parts are in the position shown in Fig. 1, a car weighing one thousand pounds will be counterbalanced by a counter-weight weighing six hundred pounds and the cables above the counter-weight and piston, weighing together four hundred pounds; but when the car descends to the position shown in Fig. 2 the four hundred pounds of cable transferred to the side above the car create a preponderating weight on that side of eight hundred pounds. Consequently there must be an excess of power equal to lifting this weight before the car, even if empty, can be started. This shifting of the weight from side to side produces irregularities in the action of the engine, and renders it necessary to provide an engine of greater power than would be otherwise needed.

I obviate these objections by the use, in connection with the car and counter-balance, of a second cable, $b$, equal in weight to that of the counter-balance and suspension-cables combined, connected at its opposite ends to the car and counter-balance, and, if desired, passing around a sheave, D, although this is not essential. By this arrangement any transfer of the upper cables from one side to the other of the counterbalance-sheave C and suspension-sheave E is accompanied by a transfer of the lower cable to the opposite side, so that the weight of the cable upon the opposite sides of the sheave is always the same, while the counter-balance A is equal in weight to the car B, or usually is so nearly equal that the excess of weight of the car is just sufficient to insure its descent when pressure is removed from the operating-piston. Thus in Fig. 3 there are two suspension-cables, $d$, one counterbalance-cable, $a$, and three supplementary cables, $b$, or, what is the same, the cable $d$ is twice the weight of $a$, and $b$ is three times the weight. When the parts are in the position shown the weight of $b$ on one side of the pulleys C E equals the combined weight of $d$ and $a$ on the opposite sides. When the parts are in the position shown in Fig. 4 the weight of $a$ and $d$ on the inner sides of the pulleys is counterbalanced by the weight of $b$ on the outer side of the pulley C.

There will, of course, be employed any suitable device for driving the car, which may operate either upon the sheaves C or D or the counterbalance or suspending rope.

The operating devices used in an ordinary Baldwin hydraulic elevator are represented in Fig. 5.

I claim—

The combination, with a car, counter-balance, and flexible suspensories, of a supplementary cable suspended from the lower ends of and connecting the car and counter-balance, and equal to the combined weight of the suspensory and counter-balance, the supplemental suspensory and counterbalance cables being relatively proportioned, substantially as set forth.

In testimony whereof I have signed my name to this specification in the presence of two subscribing witnesses.

CYRUS W. BALDWIN.

Witnesses:
CHARLES E. FOSTER,
WILLIAM PAXTON.